United States Patent [19]

Thomas, Jr

[11] 3,786,186

[45] Jan. 15, 1974

[54] ENHANCEMENT AND DETECTION OF SMALL STATIC OBJECT IN SCENE BY USE OF PROGRAMMED MOTION OF IMAGE OF SCENE

[75] Inventor: Charles Edgar Thomas, Jr, Baltimore, Md.

[73] Assignee: The United States of America as represented by the Secretary of the Air Force, Washington, D.C.

[22] Filed: June 13, 1972

[21] Appl. No.: 262,417

[52] U.S. Cl... 178/7.89, 178/DIG. 12, 178/DIG. 34, 178/DIG. 37, 178/DIG. 38, 178/6.8

[51] Int. Cl. .......................... H01j 29/89, H04n 7/18

[58] Field of Search........... 178/7.89, 7.92, DIG. 12, 178/DIG. 33, DIG. 34, DIG. 37, DIG. 38, 7.88, 6.8

[56] References Cited

FOREIGN PATENTS OR APPLICATIONS 833,856 5/1960 Great Britain ..................... 178/7.89

*Primary Examiner*—Howard W. Britton
*Attorney*—Harry A. Herbert, Jr. et al.

[57] ABSTRACT

Method of, and apparatus for, enhancing and detecting a small static object in a scene. The object perceptability against the surrounding scene is enchanced by moving a static image of the scene in a preselected programmed motion. The motion blurs the undesired clutter of the scene; and, the small static object is detected by and because of the trace made by the movement of the image of the small static object.

6 Claims, 6 Drawing Figures

ENHANCEMENT AND DETECTION OF SMALL STATIC OBJECT IN SCENE BY USE OF PROGRAMMED MOTION OF IMAGE OF SCENE

BACKGROUND OF THE INVENTION

This invention relates to a method of, and apparatus for, enhancing and detecting a small static object in a scene and, more particularly, to a method and an apparatus especially well-adapted for the detection enhancement of a small target shown by and in a viewing system, by the use of programmed image motion of the field of view of the viewing system.

The terms "small object," "small target," and "small subject," as heretofore and hereinafter used, are intended to be synonymous and interchangeable, and are intended to include, but not be limited to, a point object, a point-like object, and the like. In essence, and more specifically, the object is point-like in size in relation to, and as shown in, the scene which is viewed. Additionally, of course, the object is assumed to have reflective characteristics and properties. Further, it is assumed, as implied above, that the object is in the scene which is acquired, sensed, or the like, by the viewing system involved, and obviously is within the field of view of the viewing system. Also, it is assumed that the small object is static, or is essentially static, in the sense that it is not necessarily immobile or stationary, but rather that the relative relationship of the small object and of the scene (i.e., the background) is fixed.

Viewing systems of optical, electro-optical, radar, and of other types often are used for the detection of a small object, such as a small static target, in surroundings where the clutter of the scene largely conceals the small object and hampers or prevents its quick detection by an ovserver.

One such system, typifying the problem, involves a television viewing system which is used to search for a small reflective target. The target may be, and usually is, located amid the clutter of the terrain, including foliage and the like, in the scene acquired by the viewing system. Since the target is small, it may be unresolvable by the viewing system. Also, since the reflective characteristics of the target may be impaired by the location of, and the positioning of, the target within the clutter in the scene, the target may have relatively low signal strength at the viewing system. In other words, the signal strength of the small obscured target is certainly not distinctly stronger than the signal emitted by other objects in, and of, the scene. For these reasons, and also because of the large number of target-like signals which are received from the clutter, quick detection of the small target by an observer is difficult, if not impossible.

The small, and probably unresolvable, target under consideration might be discriminated and detected by an observer, given sufficient time, by the close inspection of a static image of the scene. He might, under these circumstances, be able to discern and detect the small target, perhaps because of its relatively small size, and perhaps because of the different (e.g., higher) signal level of the small target, as compared to the surrounding clutter objects and elements. However, in the practical reallife situations encountered in the art, the time available to the observer is simply not sufficient for the observer to perform such a close inspection.

Therefore, when this televistion type of viewing system is used, there is a genuine need for a method, and for an apparatus, which will allow the observer to rapidly sort out the small target from the clutter elements and objects, and thereby which will permit the observer quickly to detect the small target and simultaneously, which will eliminate (or, at least, will reduce) false alarms, both as to the incorrect small target and as to small targets in general. It is readily apparent that a similar need exists with regard to other viewing systems, such as mentioned above and also as to other viewing systems, such as sonar, infrared, and even in signal reconnaissaince where the search is for specific signal characteristics amid competing noise or jamming.

My invention constitutes a significant advance in the state-of-the-art, since it fulfills this current need and it obviates this current inability.

SUMMARY OF THE INVENTION

This invention pertains to a method of, and apparatus for, detecting a small static object in a scene. More specifically, my invention permits the enhancement and the quick detection of the image of a small static object in the image of a scene which includes the object.

Therefore, an object of this invention is to provide a method of effectively and reliably permitting the above-mentioned enhancement and detection.

Obviously, another object of this invention is to provide apparatus to practice the aforesaid method.

These objects, and other equally important and related objects, of this invention will become readily apparent after a consideration of the description of my invention and reference to the drawing.

DESCRIPTIONS OF THE DRAWINGS

DESCRIPTION OF THE PHENOMENA INVOLVED

Figure 1:
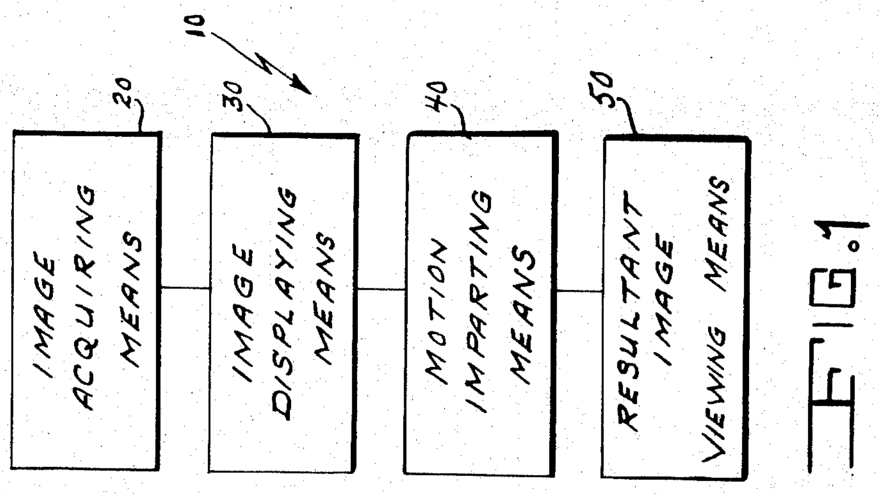
FIG. 1 is a representation, in block diagram form, of the major componets, linked and cooperating with each other, of a generic embodiment of the apparatus portion of my invention.

My method, and apparatus, are based on the techniques and phenomenon which I term "image orbiting." In turn, image orbiting is based in part on the well-known phenomenon that a still or a relatively still subject (i.e., a static object or target), the image of which is moved, appears to be moving. Image orbiting is also based, in part, on the fact which I have ascertained to the effect that a point source or point-like source, such as a small object, in a static image which is then moved, will describe a sharply-define line (i.e., a trace) which conforms to, and shows the geometry of, the motion which is imparted to the image.

The unobvious novelty of my findings, and of my application thereof to my invention, may be better appreciated and more fully understood by an approporiate example. Assume that the static image, such as a photograph, of the scene which contains the point source (i.e., the small object or small target) is oscillated or is otherwise moved in a circular (orbital) motion, where for instance the motion radius is perhaps one-twentieth to one-tenth of the image width. Then, under these circumstances, I have found that each point in and of the image moves alike, with the result that each feature or object within the scene-image is generally highly blurred, except for features or objects which are so extensive (i.e., large) that the blur is negligible compared to their large size, and except for a point or point-like source, such as a small object. The point or point-like source describes a sharply defined and clearly distinctive circle (or circular-like, or ring-like, line or trace) which exactly maps out and shows the circular motion which was imparted to the static image.

The new, useful, unexpected, and unobvious result, heretofore not attained in the art, is that the image of the point or point-like source, such as a small target, is enhanced, and the small target can be, and is, very easily and very rapidly detected by the observer who knowns the geometry of the preselected programmed motion which is imparted to the static image of the scene.

DESCRIPTION OF THE INVENTIVE METHOD

With regard to the method portion of my invention, the method comprises essentially four steps which, in part, already have been impliedly set out above.

The first step comprises acquiring (i.e., sensing) a static image of the scene and of the small static object, such as a small target, therein.

The second step comprises displaying the acquired static image of the scene and of the small static object therein.

The third step comprises imparting a preselected programmed motion to the displayed static image of the scene with the said preselected programmed motion describing a predetermined locus, such as a circle.

The fourth step comprises viewing the resultant moving image of the static scene.

The result of the performance of my inventive method, as explained hereinabove, is that the image of the small static object (i.e., the small target) is enhanced, and the small static object is detected by and because of the trace made by the movement of the image of the small static object.

DESCRIPTION OF THE GENERIC EMBODIMENT AND MODE OF OPERATION THEREOF

As a preliminary matter, it is to be noted that the term "linked" as used herein is intended to mean connected, or the like, such as mechanically, or electromechanically, or electrically (i.e., in electrical connection or by being responsive to an electrical signal from a source), or optically (i.e., in optical alignment), or in any other suitable desired, or necessary manner.

The apparatus portion of my invention includes as structure of the generic embodiment 10, as shown in FIG. 1 of the drawing, the following linked cooperative components: means for acquiring a static image of the scene and of the small static object, i.e., the small target, therein 20 (with said means hereinafter referred to interchangeably as "image acquiring means"); means for displaying the acquired static image of the scene and of the small static object therein 30 (with said means hereinafter referred to interchangeably as "image displaying means"), and with said means linked to said image acquiring means 20; means for imparting a preselected programmed motion to the displayed static image of the scene 40, with the said preselected programmed motion describing a predetermined locus, such as a circle (with said means hereinafter referred to interchangeably as "motion imparting means"), and with said means linked to said image displaying means 30; and, means for viewing the resultant moving image of the static scene 50 (with said means hereinafter referred to interchangeably as "resultant image viewing means"), and with said means linked to said motion imparting means 40.

The use of my apparatus 10 results in the enhancement of the image of the small static object; and, therefore, permits the easy and rapid detection of the small static object because of, and by, the trace or track made or formed by the movement of the image of the small static object.

Various types of each of the above-mentioned means 20, 30, 40 and 50 are known in, and are available to, the art. The selection of the particular specific means is left to the user who is in the best position to choose the means, based upon desire or need. For example, means for acquiring (i.e., sensing) a static image of the scene and of the small static object therein 20 could comprising or include a conventional television viewing system and, more specifically, the television camera component thereof, or a conventional geometric optical system. Means for displaying the acquired static image of the scene and of the small static object therein 30 could comprise or include the viewer or receiver of a conventional television viewing system, or a photograph of the acquired static image of the scene, or a reflection (such as by the use of a flat mirror) of the photograph, or an electronic image intensifier tube (or comparable devices). Means for imparting a preselected programmed motion to the displayed static image of the scene 40 could comprise or include a flat mirror which reflects the acquired static image of the scene (or which reflects a photograph of the acquired static image) and which is linked to, and suitably positioned at, one end of a shaft at a predetermined slant or tilt with respect to the shaft. The other end of the shaft is linked to an electric motor and the entire shaft is moved by the electric motor which is connected to an electric power source, thereby causing movement of the mirror in accordance with the preselected programmed motion which is to be imparted to the static image. Said motion imparting means 40 also could comprise or include an elastically mounted flat mirror moved by actuators, which will be described in detail later herein, or a plurality of magnetic deflection coils used in combination with an image intensifier tube to cause deflections of the tube's output image, in accordance with the preselected programmed motion which is to be imparted to the static image. Means for viewing the resultant moving image of the static scene 50 could comprise or include the above-mentioned moving mirrors (i.e., shaft-connected or actuator moved), or a photograph of the moving image which is reflected by the above-mentioned moving mirrors, or the output face (i.e., the phosphor face) of the above-mentioned image intensifier tube. All of the foregoing examples are solely by way of illustration only, and not by way of any limitation.

The mode of operation of the generic embodiment 10 is very easily surmised and understood from the above description of the structure thereof, so that a detail description of said operation is not believed necessary. However, in summary, it may be fairly and accurately stated that the enhancement of the image of the small static object, and that the easy and rapid detection of the small static object, is attained by the use of the linked cooperative associated components 20, 30, 40 and 50 of the generic embodiment 10 by "superimposing," so to speak, a preselected programmed motion to, or onto, the displayed acquired static imagery of the scene which, of course, is within the field of view of the image acquiring (or sensing) means 20, and which scene also, of course, includes the small static object that, in turn, makes a resultant trace or track in the form or shape of the geometry of the preselected programmed motion.

DESCRIPTION OF PREFERRED EMBODIMENTS AND MODE OF OPERATION THEREOF

Figure 2:
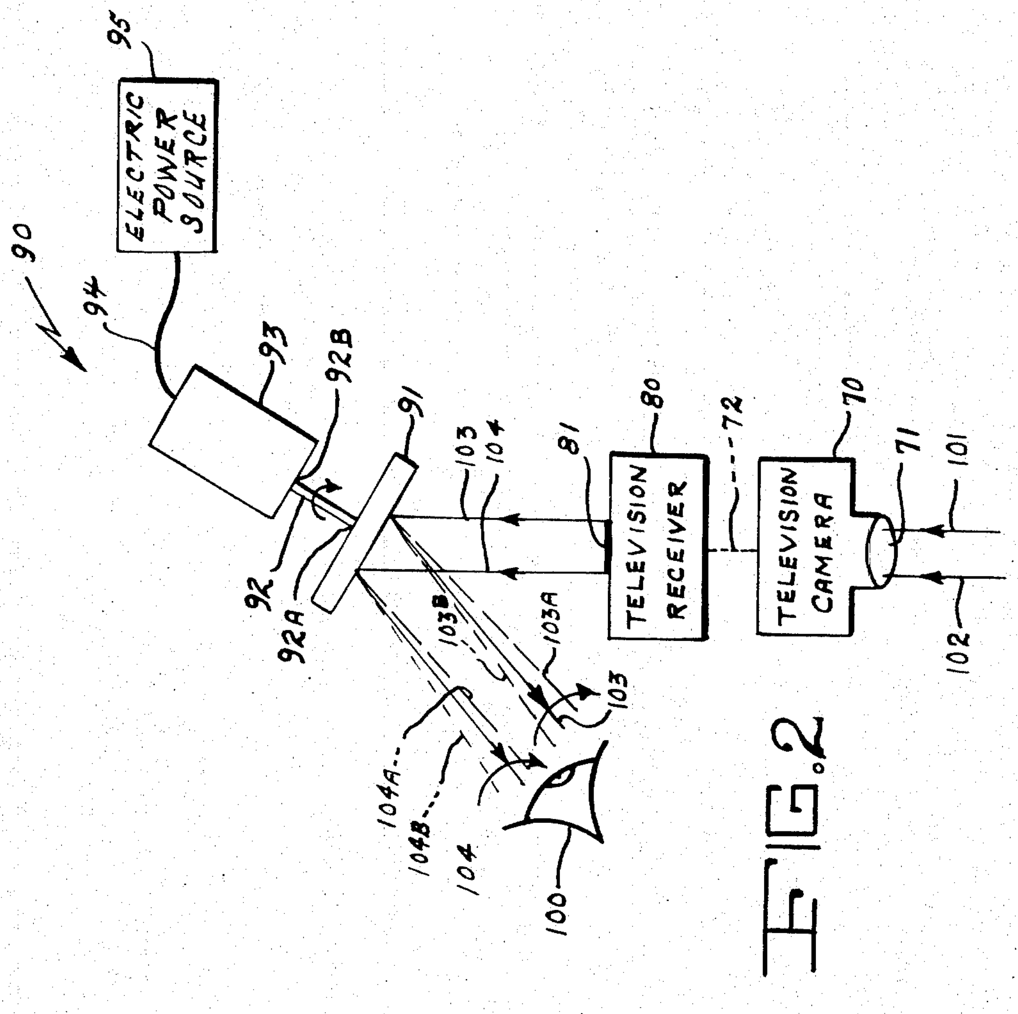
FIG. 2 is a side elevation view, in overall simplified schematic form, partially in block diagram form and partially in cross-section, of a preferred embodiment of the apparatus portion of my invention.
Figures 5, 6:
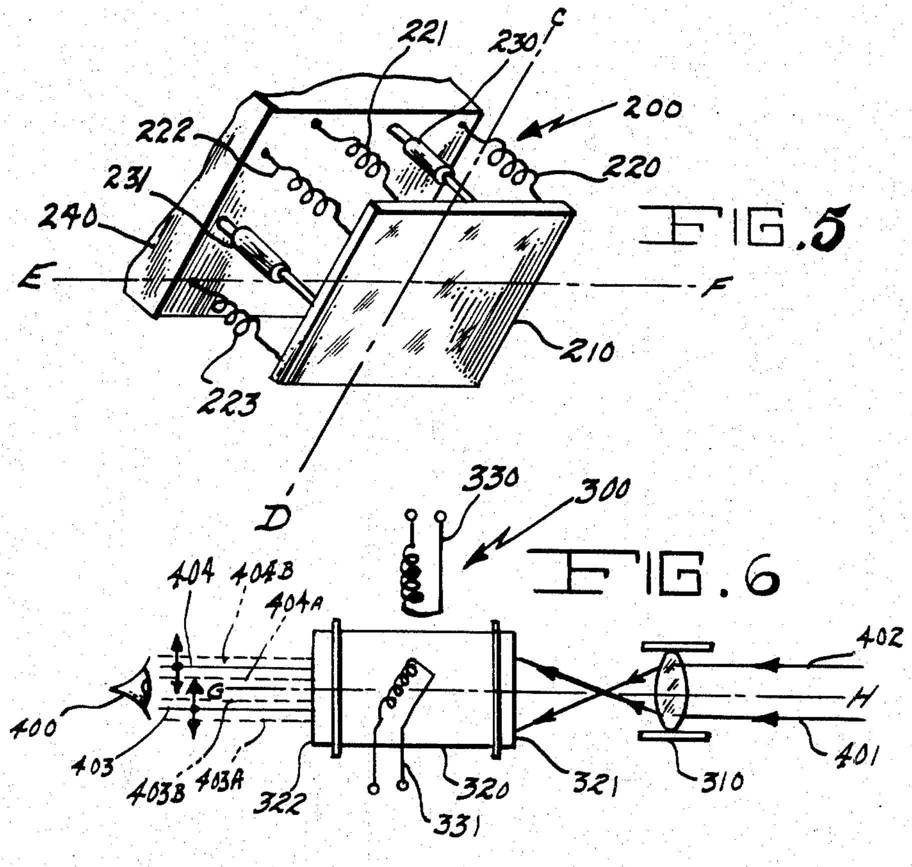
FIG. 5 is a perspective view, partially fragmented and in simplified schematic form, of a subassembly component which is equivalent to, and may be used in place of, the mirror subassembly component shown in FIGS. 2, 3 and 4.
FIG. 6 is a side elevation view, in simplified schematic form and partially in cross-section, of another preferred embodiment of the apparatus portion of my invention.

My inventive preferred embodiments, and components thereof, can be better understood and appreciated if the following preliminary matters are noted and remembered, with particular reference to FIGS. 2 and 6 herein.

Figure 3:
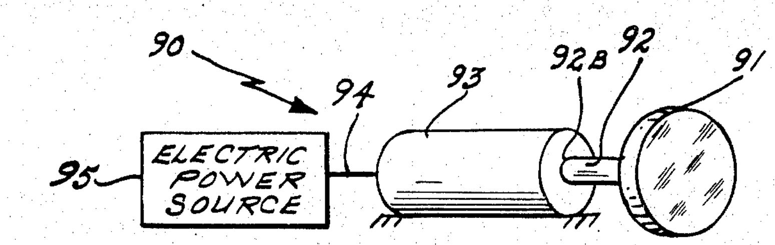
FIG. 3 is a side elevation view, partially in perspective and partially in schematic form, of the mirror subassembly component of the preferred embodiment shown in FIG. 2.
Figure 4:
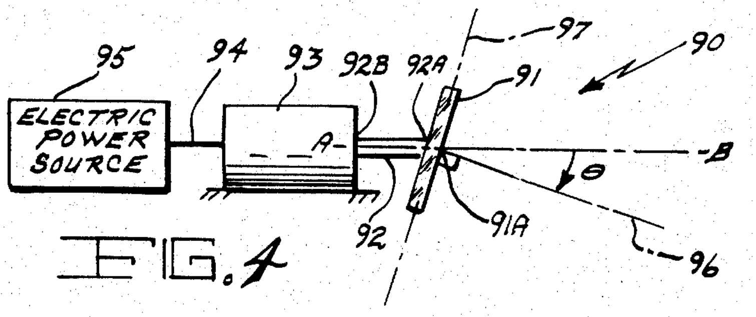
FIG. 4 is another side elevation view, in schematic form, of the mirror subassembly component shown in FIGS. 2 and 3.

It is emphasized, firstly, that although the preferred embodiments shown in FIGS. 2 and 6 are in simplified schematic form and not to scale, the embodiments are depicted in sufficient detail to permit a person of ordinary skill in the art to understand, make and use the embodiment. Secondly, with regard to the optical geometry shown in FIGS. 2 and 6, including light beam rays, it is not intended to depict in said Figures the optical geometry with the same exactness as that which would be shown if optical ray tracing, or the like, were to be used to determine preceisly the positions of the electro-optical and optical components and of the light ray beams, or the size and location of the image concerned. Thirdly, in the interest of maintaining the simplicity of FIGS. 2 and 6, the scene involved and the small object therein are not shown. Fourthly, the preferred embodiments shown in FIGS. 2 and 6, and the components or subassemblies shown in FIGS. 3, 4 and 5, are merely by way of illustration, and not by way of any limitation. Obviously, other embodiments, and components thereof, are possible, and indeed may be preferred in a particular situation and under certain specific circumstances.

With reference to FIG. 2, therein is shown, in overall simplified schematic form, partially in block diagram form and partially in cross-section, a side elevation view of a preferred embodiment 60 of the apparatus portion of my invention. Preferred embodiment 60 includes, as major components: a conventional television camera 70; a conventional television receiver 80 linked, either directly by electrical connection or indirectly by signal means, to television camera 70; and a mirror subassembly 90 having a mirror 91 which is linked to (i.e., is in optical alignment with) television receiver 80.

More specifically, and still with reference to FIG. 2, television camera 70 with input face 71 is suitably positioned to view, the desired scene which contains the small static object therein. Although, as previously stated, the scene is not shown in FIG. 2, representative light beam rays 101 and 102 define and limit the desired scene. The rays 101 and 102, and the light from the scene they represent, impinge upon the input face 71 of the television camera 70, and thereby an image of the desired scene is acquired or sensed by television camera 70. Since the television camera 70 is not panned, and is not otherwise moved, it continually senses and acquires the same image, i.e., a static image. Therefore, television camera 70 comprises means for acquiring a static image of the desired scene and of the small static object therein, i.e., image acquiring means.

Television receiver 80, FIG. 2, has an output face 81 (i.e., viewing screen) and is linked, as described above, to television camera 70 or, more accurately, to the output thereof. The "linkage" between camera 70 and receiver 80 is schematically represented by dotted line 72. The static image acquired by camera 70 is displayed on viewing screen 81 of receiver 80. As a result, television receiver 80 comprises means for displaying the acquired static image of the scene and of the small static object therein, i.e., image displaying means.

Mirror subassembly 90, FIG. 2, includes a flat mirror 91 linked to (i.e., in optical alignment with) television receiver 80 and, more accurately, with the viewing screen 81 thereof. Mirror subassembly 90 also includes: shaft 92 with two ends, 92A and 92B; electric motor 93; electric power source 95; and electrical connector 94. Mirror 91 is mounted at one end 92A of shaft 92. The flat mirror 91 is slanted (i.e., tilted or angled) with respect to the shaft 92, as will be described and shown later herein. The other end 92B of shaft 92 is linked to electric motor 93 which is in electrical connection with electric power source 95 by electrical connector 94. As can be easily surmised, electric power source 95 operates the electric motor 93 which, in turn, rotates the shaft 92, and the slanted mirror 91 mounted thereto.

Still with reference to FIG. 2, representative light beam rays 103 and 104 define and limit the acquired static image displayed at screen 81. The rays 103 and 104, and the light from the image which they represent and which is displayed at screen 81, impinge upon flat mirror 91 and are reflected from mirror 91 to observer 100. Since flat mirror 91 is slanted or tilted, the observer 100 will see the resultant moving image of the static scene, with the motion of the image being in accordance with a preselected programmed motion describing a predetermined locus, such as a circular, nutational motion. It is here to be remembered, as previously set forth herein, that the observer 100 knows the geometry of the preselected programmed motion which is imparted to the static image of the scene. Therefore, the observer 100 can very easily and very rapidly detect the small static object, since said object is enhanced and is made detectable by and because of the trace made by the movement of the image of the small static object. In FIG. 2 the limits of the moving image of the static scene (and of the small static object therein) are schematically shown by phantom lines 103A, 103B, 104A and 104B. Mirror subassembly 90 may, therefore, be said to comprise the motion imparting means and the resultant image viewing means of preferred embodiment 60.

With reference now to FIG. 3, therein is shown another view, partially in perspective and partially in schematic form, of mirror subassembly 90 of preferred embodiment 60 shown in FIG. 2. Mirror subassembly 90 includes: conventional electric motor 93; electrical power source 95 in electrical connection with motor 93 by electrical connector 94; a shaft 92 having two ends, with one end 92B linked to electric motor 93; and a flat mirror 91 mounted, at a predetermined slant (i.e., tilt) at the other end of shaft 92.

With regard to FIG. 4, therein is shown still another view of mirror subassembly 90 shown in FIGS. 2 and 3. This view is a side elevation view in schematic form and shows flat mirror 90 mounted at end 92A of shaft 92 at a slant or tilt, shaft 92 with end 92B linked to electric motor 93, and electric power source 95 in electrical connection 94 with electric motor 93. Also shown are: shaft longitudinal axis A–B, perpendicular 96 to flat mirror 91 (and to plane 97 thereof) at the point of intersection 91A (on mirror 91) of shaft axis A–B with mirror 91, and the angle $\theta$ which is formed by the intersection of shaft longitudinal axis A-B and perpendicular 96.

The appropriate value of this angle $\theta$ will be discussed and evaluated below with reference to a particular instance. However, it can be easily seen from FIG. 4 that rotation of shaft 92 and of slanted flat mirror 91 will cause the perpendicular 96 to describe a small cone, the half-angle of which is $\theta$. The displayed static image of the desired scene which impinges upon, and is reflected by, moving flat mirror 91 will have a circular, nutational motion. The angular motion of the image will equal twice the angular motion of perpendicular 96, or $2\theta$.

As previously stated, the desired image-motion is typically from one-twentieth to one-tenth of the width and/or height of the total field-of-view. For viewing by the unaided eye, this field-of-view is approximately 40° full-angle. Therefore, the desired conical nutation of the image would be 4°, or 2° half-angle. The corresponding value of the angle $\theta$, FIG. 4, in this instance would be approximately 1°.

If a television viewing system (such as 70 and 80, FIG. 2) is used in the preferred embodiment (such as 60, FIG. 2), it is desirable that a cyclic motion of the image be made within the television frame-time, typically equal to one-thirtieth of a second. Therefore, in such an embodiment (i.e., 60 in FIG. 2), a mirror 91 rotation of 30 revolutions per second or more is desirable.

With reference to FIG. 5, therein is shown in a perspective view, partially fragmented and in simplified schematic form, a subassembly component 200 which is equivalent to, and may be used in place of, the mirror subassembly component 90 shown in FIGS. 2, 3 and 4. Subassembly 200 includes: base 240; flat mirror 210 in spaced relationship to base 240; a plurality of conventional elastic mounts, such as 220, 221, 222 and 223, disposed between and connecting flat mirror 210 and base 240; and a plurality of conventional actuators, such as 230 and 231, disposed between and connecting flat mirror 210 and base 240. Also shown in FIG. 5 are mutually perpendicular (i.e., orthogonal axes C–D and E–F of, and in the plane of, flat mirror 210. Not shown, in the interest of maintaining simplicity of FIG. 5, is the signal driving means (i.e., means for moving) for the actuators, such as 230 and 231.

Th mode of operation of mirror subassembly 200 is self-evident from an inspection of FIG. 5 and the description of subassembly 200 set out above, in essence, and succinctly, specific driving signals are fed to the actuators, such as 230 and 231, which, in turn and in response to the signals, cause oscillatory motion of the flat mirror 210 about axes C–D and E–F, in accordance with the specific driving signals provided. Elastic mounts, such as 220, 221, 222 and 223 permit this small amplitude oscillatory motion of mirror 210. If the actuators, such as 230 and 231, are caused to move mirror 210 sinusoidally in each axis, and if these sinusoidal drive signals are equal in amplitude but differ in phase by 90°, then the perpendicular (not shown) of the mirror 210 will be caused to have a circular, motion similar to the motion described in connection with mirror subassembly 90, FIGS. 2, 3 and 4. Since the drive signals to the actuators, such as 230 and 231, can be readily varied at will, the actuators can be used to provide linear (i.e., one axis), oscillatory, ellipsoidal, circular or other desired motion of the mirror 210 and/or to provide variable amplitudes to such motions.

With reference to FIG. 6, therein is shown, in a side elevation view, in simplified schematic form and partially in cross-section, of another preferred embodiment 300 of the apparatus portion of my invention. Embodiment 300 includes: a lens 310 having an optical axis; an image intensifier tube 320, disposed rearward of said lens 310, with said image intensifier tube 320 having an input face 321 (i.e., the photocathode), and an output face 322 (i.e., the phosphor face), and an optical axis; and a plurality of conventional deflection coil assemblies, such as 330 and 331. The optical axes of lens 310 and of image intensifier tube 320 are coincident and are schematically represented, in FIG. 6, by axis G–H. Not shown, in the interest of maintaining simplicity of FIG. 6, is the signal driving means for the deflection coil assemblies, such as 330 and 331, and the desired scene to be viewed which contains the small static image therein.

More specifically, and with reference to FIG. 6, lens 310 is suitably positioned to view (i.e., image and focus) the desired scene which contains the small static object therein. Although, as previously stated, the scene is not shown in FIG. 6, representative light beam rays 401 and 402 define and limit the scene. The rays 401 and 402, and the light from the scene that they represent, impinge upon lens 310 which is then maintained in a stationary position; and, therefore, lens 310 continually senses and acquires the same image, i.e., a static image, and comprises the image acquiring means of preferred embodiment 300.

Lens 310 transmits and directs the acquired static image to the input face 321 (i.e., the photocathode) of image intensifier tube 320 wherein the image is intensified (i.e., amplified in light level). The intensified static image is displayed at output face 322 (i.e., the phosphor face) of intensifier tube 320 which comprises the image displaying means of preferred embodiment 300.

Tube 320 also comprises, in part, the motion imparting means and the resultant image viewing means of embodiment 300, as will be explained later herein.

Again with reference to FIG. 6, representative light beams 403 and 404 define and limit the acquired static image displayed at intensifier tube output face 322. However, the magnetic deflection coil assemblies, such as 330 and 331, which are provided in embodiment 300, are so positioned and are so arranged with respect with intensifier tube 320 as to cause preselected deflections, such as are schematically represented by 403A, 403B, 404A and 404B, of the acquired static image which is displayed at intensifier tube output face 322. The deflections are, or may be, in each of two orthogonal, lateral directions (e.g., up-down and right-left on output face 322). These deflections are governed by the strengths of the input signals from the signal driving means (not shown) to each of the deflection coil assemblies, with each coil assembly controlling the deflection of the image in its, the coil assembly's, corresponding lateral direction. The input or drive signals to each coil assembly may be chosen so as to effect a circular, linear, or other desired programmed motion to the image at the output face 322 of intensifier tube 320. For instance, equal-amplitude sinusoidal drive signals differing by 90° in phase will produce a circular motion. Therefore, the intensifier tube 320 and the plurality of magnetic deflection coil assemblies, such as 330 and 331, comprise the motion imparting means of embodiment 300; and, intensifier tube 320 comprises the resultant image viewing means of embodiment 300.

The light from the deflected or moved image of the static scene (and of the small static object therein), which is in fact the resultant moving image of the static scene, is directed toward, and is seen by, the observer 400 who knows the geometry of the preselected programmed motion which is imparted to the static image of the scene and who, therefore, can easily and rapidly detect the small static object which, in turn, is enhanced and is made detectable by and because of the trace made by the movement of the image of the small static object.

While there have been shown and described the fundamental features of my invention, as set forth in an inventive method and as applied to a preferred embodiments, it is to be understood that various substitutions, omissions and adaptations may be made by those of ordinary skill in the art without departing from the spirit of the invention. For example, the invention can be used, or can be adapted to be used, for enhancing the image of, and detecting, a line or a line-like small target by preselecting and using a programmed motion which is linear.

What I claimed is:

1. The method of enhancing and detecting the image of a small static object in the image of a scene which includes the object, wherein said object is detectable by and because of its trace when the image of said object is moved, comprising the steps of:

a. acquiring a static image of the scene and of the small tatic object therein;

b. displaying the acquired static image of the scene and of the small static object therein;

c. imparting a preselected programmed motion to the displayed static image of the scene, with said preselected programmed motion describing a predetermined locus;

d. and, viewing the resultant moving image of the static scene;

whereby the image of the small static object is enhanced and is detected by and because of the trace made by the movement of the image of the small static object.

2. Apparatus for enhancing and detecting the image of a small static object in the image of a scene which includes the object, wherein said object is detectable by and because of its trace when the image of said object is moved, comprising:

a. means for acquiring a static image of the scene and of the small static object therein;

b. means for displaying the acquired static image of the scene and of the small static object therein, with said means linked to said image acquiring means;

c. means for imparting a preselected programmed motion to the displayed static image of the scene, with said preselected programmed motion describing a predetermined locus, and with said means linked to said image displaying means.

d. and, means for viewing the resultant moving image of the static scene, with said means linked to said motion imparting means;

whereby the image of the small static object is enhanced and is detected by and because of the trace made by the movement of the image of the small static object.

3. The apparatus, as set forth in claim 2, wherein said image acquiring means and said image displaying means comprise:

a. a television camera;

b. and, a television receiver linked to said television camera.

4. The apparatus, as set forth in claim 2, wherein said motion imparting means and said resultant image viewing means include a mirror subassembly which comprises:

a. a shaft having two ends;

b. a flat mirror mounted at one end of, and at a predetermined slant to, said shaft;

c. an electric motor linked to the other end of said shaft;

d. and, an electrical power source linked to said electric motor.

5. The apparatus, as set forth in claim 2, wherein said motion imparting means and said resultant image viewing means include a mirror subassembly which comprises:

a. a base;

b. a flat mirror in spaced relationship to said base;

c. a plurality of elastic mounts disposed between, and connecting, said base and said flat mirror;

d. and, a plurality of actuators disposed between, and connecting, said base and said flat mirror.

6. The apparatus, as set forth in claim 2, wherein said motion imparting means and said resultant image viewing means comprise:

a. an image intensifier tube;

b. and, a plurality of magnetic deflection coil assemblies so arranged and so positioned as to cause preselected deflections of any image intensified by said image intensifier tube.

* * * * *